March 28, 1961 W. H. LYNCH ET AL 2,977,257

METHOD AND APPARATUS FOR FABRICATING JUNCTION TRANSISTORS

Filed Sept. 17, 1959 3 Sheets-Sheet 1

INVENTORS
William H. Lynch
John G. Vent
Carlton D. Barker
BY
Robert E. Fowler
ATTORNEY

METHOD AND APPARATUS FOR FABRICATING JUNCTION TRANSISTORS

Filed Sept. 17, 1959 3 Sheets-Sheet 2

INVENTORS
William H. Lynch
John G. Venf
BY Carlton D. Barker
Robert E. Fowler
ATTORNEY INVENTORS
William H. Lynch
John G. Vent
Carlton D. Barker
BY Robert E. Fowler
ATTORNEY 2,977,257
Patented Mar. 28, 1961

2,977,257

METHOD AND APPARATUS FOR FABRICATING JUNCTION TRANSISTORS

William H. Lynch and John G. Vent, Kokomo, and Carlton D. Barker, Tipton, Ind., assignors to General Motors Corporation, Detroit, Mich., a corporation of Delaware Filed Sept. 17, 1959, Ser. No. 840,678

4 Claims. (Cl. 148—1.5)

This invention relates to semi-conductor signal translating means and more particularly to a method and apparatus for fabricating junction type transistors.

Junction type transistors are formed of a thin sheet of semi-conductor material having certain desired conductive characteristics upon opposite sides of which may be alloyed small areas of material producing opposite conductivity characteristics areas when alloyed to the main body and this material forms the emitter and collector electrodes of the transistor. It is also necessary to provide at least one plain ohmic contact to the semi-conductor body which forms a base electrode. While our invention may be utilized with a large variety of different materials, for illustrative purposes only, it is described as applied to a method to fabricate a PNP transistor formed of germanium having N type characteristics to which will be alloyed indium members introducing P type areas together with certain ohmic contacts.

One of the problems involved in fabricating transistors is that the parts are small and rather difficult to handle, plus the fact that because of the small size the contact areas of the electrodes over which they are alloyed or through which they are secured together, become most important. For example, a small area under the collector electrode which is not properly alloyed to the main body through improper wetting might cause the resultant transistor to have inferior operation or perhaps even fail.

It is, therefore, an object of our inveniton to provide a method of fabricating transistors so that all parts will be satisfactorily secured together or alloyed over maximum areas to provide optimum operation. Our invention provides a fixture for supporting the small parts during the assembly process from which the resultant transistor can be easily removed when all of the parts have been secured together. This fixture supports all of the parts, some in spaced relation to each other until certain temperatures are reached and then allows the parts to approach each other and contact under the most favorable joining conditions so that satisfactory end products will be obtained.

Our invention will be best understood by reference to the following specification and claims and the illustrations in the accompanying drawings, in which:

Figures 4, 5, 6:
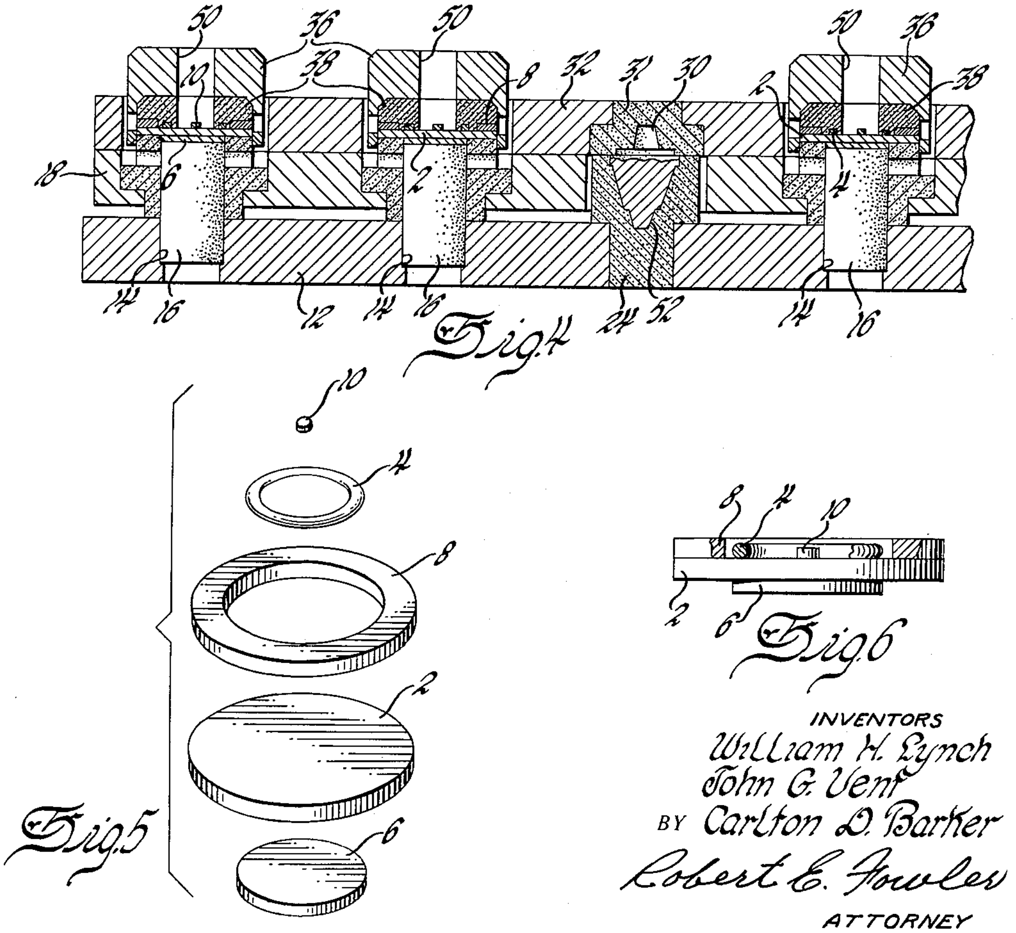
Figure 4 is a vertical section taken through a similar part of the fixture after heat has been applied and the transistor parts automatically brought into juxtaposition for assembly and ready for cooling.
Figure 5 is an exploded perspective view showing all of the parts of the basic transistor.
Figure 6 is an enlarged side view, partly in section, of the assembled transistor; and, Figure 7 is an enlarged exploded perspective view of all of the parts associated with one loading station of the jig for assembling a single transistor.

Referring now more particularly to Figures 5 and 6, there is shown therein an example of an alloyed junction type transistor which it is desired to fabricate. In that case and referring first to Figure 5, there is shown a main body 2 which may be of germanium and in our illustrative example this could be a body having an N type conductivity characteristic. Above the body 2 there is shown a ring 4 of indium which is to act as the emitter electrode and will be alloyed to the upper face of the disc 2. Below the body 2 there is shown in spaced relation a second disc 6 also of indium which will act as the collector electrode and will be alloyed to the lower face. These, therefore, provide the emitter and collector electrodes. For the ohmic or base contacts for the transistor two elements are provided, the first, a large circular ring 8 of greater diameter than the emitter ring 4 and adapted to lie outside that on the upper surface of the disc 2. This ring may be made of any suitable electrical contact material capable of adhering to the upper surface of the germanium disc 2 and forming a pure ohmic contact therewith. The second base contact is a small button 10 adapted to be affixed to the center of the upper surface of the disc 2 in the center of the ring 4. This is an additional base contact and when in circuit is electrically connected with the outer base ring 8.

Figure 6 shows all of these parts after they have been assembled and the transistor is ready for mounting in some type of encapsulation or housing. Taking the five parts as they are shown in exploded view Figure 5, it is desired to explain that it has been found advantageous to hold the germanium disc 2 and the indium disc 6 apart while raising the temperature of the indium disc 6 sufficiently to cause the same to become molten at which time the upper surface of the disc 6 changes from a flat surface to a spherical one and thus as the germanium disc 2 is brought down upon it, any air or occlusions are forced outwardly forming much better overall wetting and alloyed contact as a result. Our fixture, therefore, provides a means for supporting the disc 2 and the indium disc 6 in spaced relation until the temperature has been raised a sufficient amount. The other members 10, 4 and 8 are supported in contact with the upper face of the disc from the initial assembly of the fixture.

Figure 7:
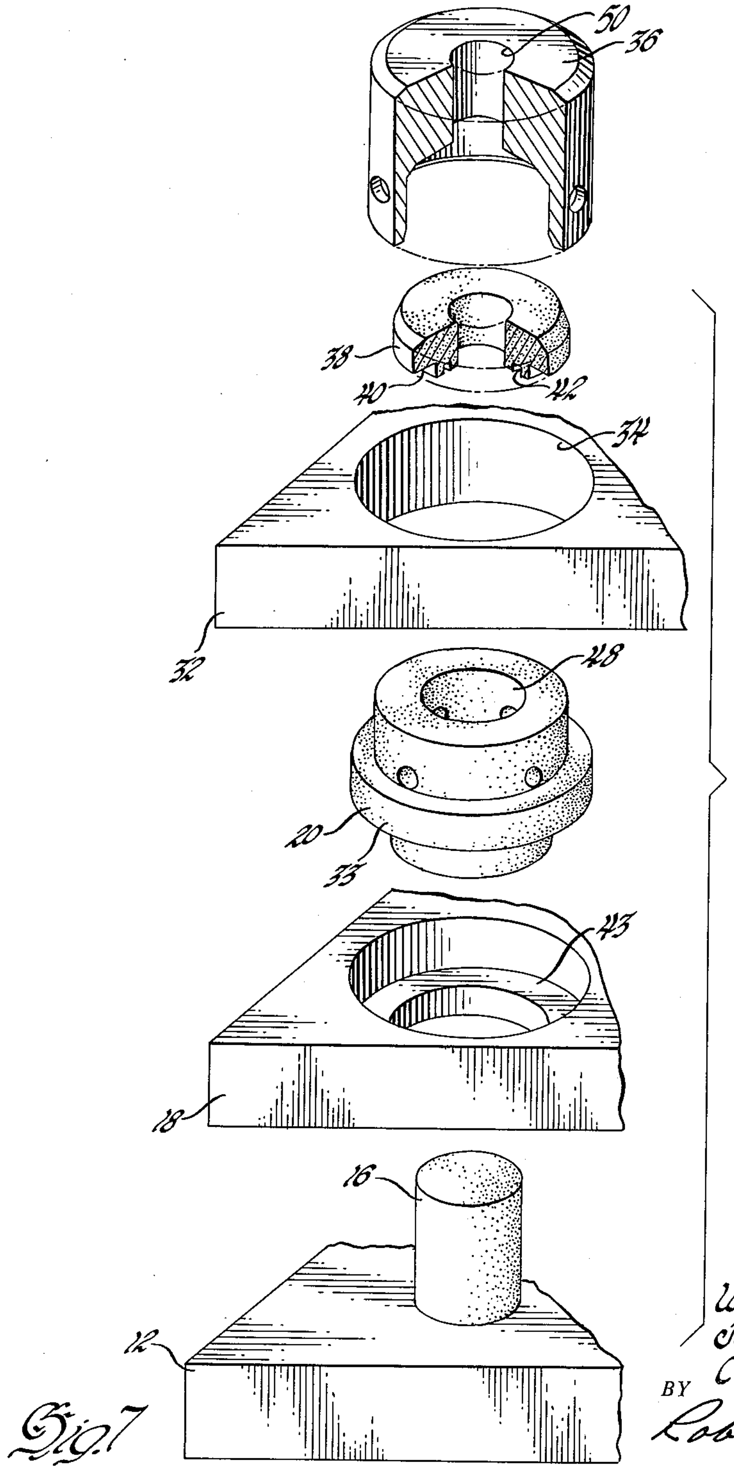

The fixture consists of two principal subassemblies together with individual parts to provide a series of stations at which it is desired to assemble transistors. For example, any one fixture might have a sufficient number of stations to load and assemble twelve transistors. Any number, of course, could be provided. Each station is, of course, identical with the others. The two principal subassemblies consist of a plate 12 having openings 14 drilled into the plate 12 into which are press fitted small graphite posts 16 approximately the same diameter as the indium discs 6. A second subassembly includes member 18 of the same general outline and configuration as the plate 12 which is fixedly secured to a second plate 32 by dowel pins 17 and bolts 19. These plates have mating series of openings therein which carry jigs for specifically supporting the parts of the transistors as shown in Fig. 5 for alloying. These parts, as best shown in Figure 7, include a graphite sleeve 20 whose outer diameter fits into an opening 22 in the member 18 and whose inner diameter is the same size as the outer diameter of the graphite post 16 and of the outer diameter of the indium discs 6. Associated with each sleeve 20 is a cap 36 of stainless steel having a graphite insert 38 with grooves 40 and 42 in its lower face to enclose and house the rings 4 and 8 when in assembled position.

In the center of the member 12 there are mounted several hollow riser plugs 24 having a pyramidal central opening 26 whose outer edge is flanged outwardly. To maintain spacing between the two subassemblies during preheating there is inverted on top of each riser, and having a flanged edge to fit into the flange of the riser, a solder plug 28 also of conical shape which extends into a smaller conical opening 30 in a plug 31 in support member 32 holding the second subassembly in spaced relation with respect to the first. This solder plug 28 is utilized to hold the members in spaced relation until the temperature has been raised above the melting point of indium so that the indium disc 6 can become molten and assume a spherical upper surface. Then when the plug melts the solder flows down into each cavity 26 in the support 12 allowing the members to come together and the lower surface of the germanium disc 2 will press downwardly on the molten indium on top of each graphite post 16 while circumferentially restrained by the member 20 surrounding each indium disc 6 on top of the post 16.

Before describing how the fixture is loaded and fired it is desired to point out that the fixture caps 36 together with graphite inserts 38 press fitted into the end provide sufficient loading pressure and are adapted to press downwardly directly on top of the germanium disc 2. The insert members 38 have annular grooves 40 and 42 in their lower surface in which the base ring and emitter electrodes 4 are adapted to lie when in place. The sleeve member 20 which fits over the end of each post 16, supports the main body of the transistor 2 when all the elements are in place and ready for firing.

Figure 1:
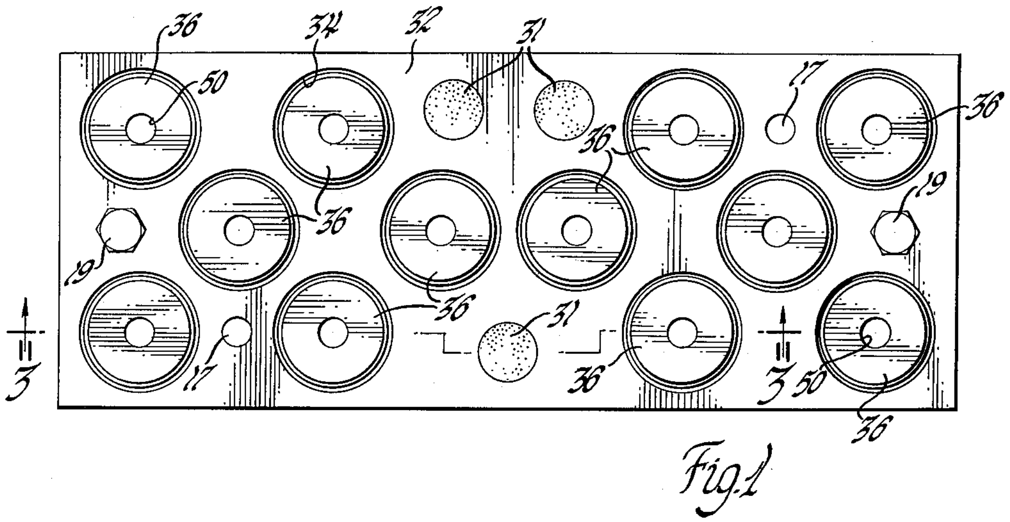
Figure 1 is a top plan view of a fixture embodying our invention for supporting a plurality of transistor assemblies for fabrication.
Figure 2:
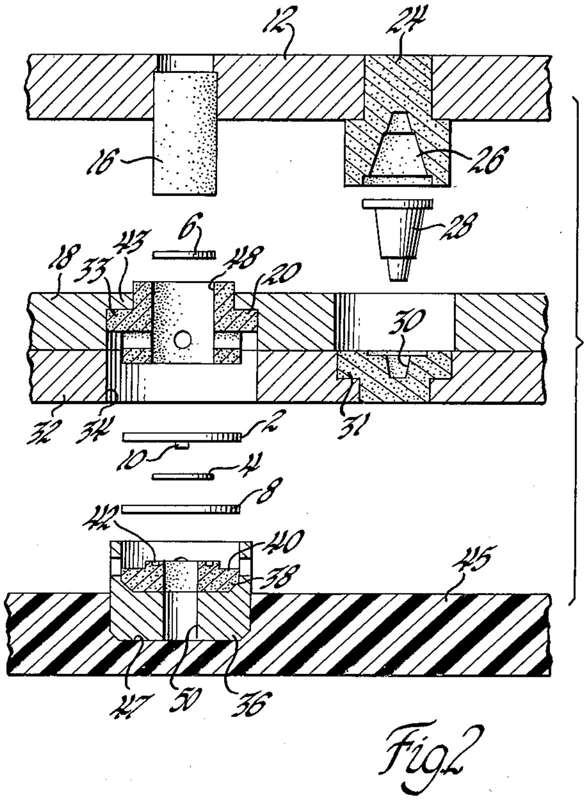
Figure 2 is an exploded sectional view taken through one of the loading stations showing the parts of the transistor as they go in place and a spacing plug section.

In order to load preliminary to inserting the fixture in an oven to raise the temperature and thus fabricate the various transistors, the first step is to take plastic holder 45 such as shown in Fig. 2 which is provided with a series of depressions 47 adapted to receive the caps 36. The depressions 47 in the holder 45 are of the proper pattern to match the openings 34 in the subassembly 32—18 as shown best in Fig. 1. The holder is positioned with the depressions facing upwardly. Next a cap 36 with its insert 38 in place is dropped into each depression with the grooved face of the insert 38 facing up. An emitter ring 4 is then dropped into each groove 42 and a base ring 8 into each groove 40. Then a main germanium disc 2 is dropped over the rings and into the end of the insert 38. Following this a hollow sleeve member 20 is mounted in the end of each cap to press down on the discs 2. Now the subassembly of plates 32 and 18 is lined up so that the openings 34 are in alignment with the unit assemblies and then lowered until the shoulders 43 contact the flanges 33 on sleeves 20. The parts of the transistors are now mounted in proper relation except the collector disc 6 and the central base contact 10.

The assembly is still positioned with the caps supported in the plastic holder. The collector discs 6 are now dropped down through the central openings 48 in the sleeves 20 and will for the time being rest on the face of each associated germanium disc 2. At this stage the operator has placed all of the parts of the transistor in juxtaposition with the exception of the small central base contact 10. The last subassembly is provided so that the collector discs 6 may be supported in spaced relation to the main discs 2 during the initial heating period. To accomplish this low melting point alloy plugs are used to keep the final assembly plate 12 in spaced relation to the remainder of the assembly. One or more plugs 28 are next inserted in openings 30 in graphite members 31 in plate 32. The lower ends of the plugs conform to the shape of the openings. As a final step posts 16 mounted on plate 12 are now aligned with each opening 48 in the bushing members 20 and this subassembly descends toward the plates 18—32 until the risers 24 engage the tops of the alloy plugs 28.

Figure 3:
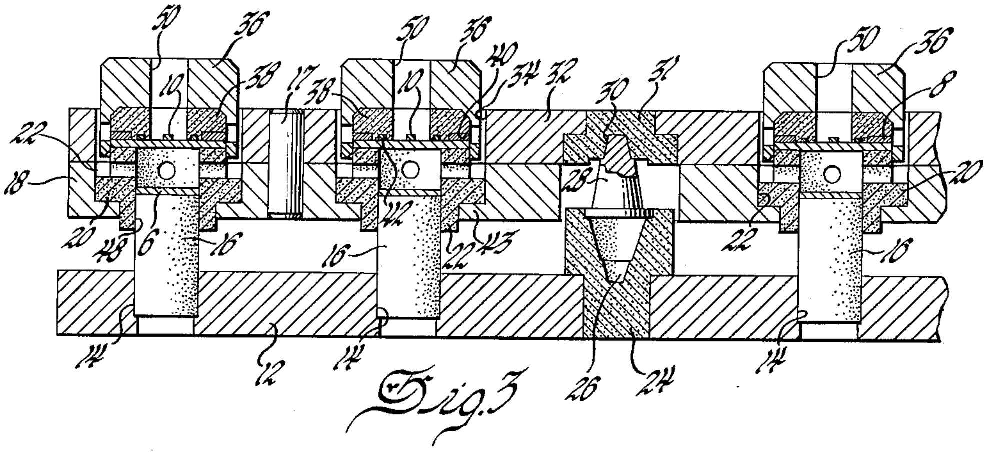
Figure 3 is a vertical sectional view taken on line 3—3 of Figure 1 of the supporting fixture when the same has been fully loaded with transistor parts prior to the application of heat.

The whole fixture is then grasped firmly and inverted. This allows the collector discs 6 to fall away from contact with what is now the lower face of the germanium members 2 and to rest upon the upper ends of the posts as shown in Figure 3 and are thereby spaced at approximately the distance indicated. The plastic holder 45 is next removed. Now all of the parts are in position except the base contacts 10 which are each dropped down through the central opening 50 in the main caps 36 to rest in their desired positions on the upper central portion of the germanium disc 2.

The fixture is now ready for firing and insertion in the furnace. As the heat is raised a hydrogen atmosphere is provided surrounding the fixture to clean both the alloy members and the disc and the alloying process begins and first the ohmic contacts 10 and 8 are soldered to the upper surface of the disc 2. At a higher temperature the indium ring 4 will alloy to the upper surface of the disc 2 and lastly at a predetermined temperature the solder spacing plugs 28 will melt flowing down into the cavities in the risers 24 and allowing the upper assembly to descend forcing each one of the collector discs 6, which are now in a clean molten state, up against the cleansed lower surfaces of the associated germanium disc. The spherical shape of the disc 6 in its molten form squeezes out any impurities or occlusions and provides a practically 100% wetting of the surface as the parts are brought together to give a good alloyed junction.

After this the fixture may be removed and allowed to cool following which the plastic holder 45 is placed on top to hold the caps and the whole is again inverted and the base assembly 12 lifted off. The molten solder plugs 28 have re-formed in the cavities in the same configuration as before as shown at 52 and can be reused over and over again and when the posts 16 and plate 12 and later the assembly of plates 18 and 32 and the bushing members 20 are removed the transistors can be taken out in their finished form. The fixture is now ready to be re-charged for the next batch of transistors.

What is claimed is:

1. In means for fabricating semi-conductor amplifying means which have a flat, thin semi-conductive body of one electrical conductivity type to the opposite faces of which are alloyed a plurality of members to convert areas of the body to another electrical conductivity type having rectifying barriers and to at least one face of which are secured ohmic contacts, including means for supporting one or more semi-conductive bodies with a member to be alloyed and ohmic contacts on one face in proper position, means for supporting a second member to be alloyed to each body in alignment with and in spaced relation to the body and means having a low melting point extending between the first and second means to hold them in spaced relation at room temperature but to become molten at high temperature and permit the first and second means to contact and cause engagement of the body and second member.

2. In means for fabricating alloyed junction type transistors having a flat disc body of one type electrical conductivity to the opposite faces of which are alloyed a ring and a disc to convert areas of the disc body to the opposite type of electrical conductivity, and ohmic contacts, a first supporting means to support the disc body, ring and ohmic contacts in proper position, a second supporting means to support the disc contact in proper alignment with but spaced from the body, a spacing member of low melting point material extending between the first and second supporting means and holding the two apart under room temperature but melting at advance temperatures to permit the first and second supporting means to come into contact through gravitational force and the disc to contact the lower surface of the body to properly wet and alloy the same.

3. In a method of fabricating alloyed junction type transistors the steps of placing ohmic contacts and an alloying contact on a semi-conductor body maintained in proper position, supporting a second alloying contact below said body at a spaced distance by means having a melting point approximately that of the alloying contacts, applying hydrogen throughout the heating cycle to cleanse the parts, heating the assembly to first melt the alloying contacts and then the spacing means, then as the temperature rises the second alloying contact will become molten and finally the spacing member will melt to allow the parts to come together, the molten second alloying contact wetting the surface of the body upon contact to form a good alloy junction.

4. In a method of fabricating alloyed junction type transistors having a flat main semi-conductor body to opposite faces of which are alloyed members to form rectifying junctions, the steps of simultaneously alloying members to said opposite sides of said body by placing one member on said body and holding the second member in spaced relation thereto, supplying hydrogen to the area, heating the assembly until the members are molten and then causing said body to engage the second member and holding them together until cool.

References Cited in the file of this patent

UNITED STATES PATENTS

| | | |
|---|---|---|
| 2,881,103 | Brand et al. | Apr. 7, 1959 |
| 2,888,782 | Epstein | June 2, 1959 |
| 2,900,287 | Bestler et al. | Aug. 18, 1959 |
| 2,913,642 | Jenny | Nov. 17, 1959 |

FOREIGN PATENTS

| | | |
|---|---|---|
| 782,863 | Great Britain | Sept. 11, 1957 |